United States Patent [19]

LeBreton

[11] Patent Number: 4,705,468
[45] Date of Patent: Nov. 10, 1987

[54] APPARATUS FOR ROTATIONALLY CASTING A PLASTIC TANK LINER HAVING AN ACCESS FITTING

[75] Inventor: Edward T. LeBreton, Mentor, Ohio

[73] Assignee: Essef Corporation, Chardon, Ohio

[21] Appl. No.: 799,331

[22] Filed: Nov. 18, 1985

[51] Int. Cl.⁴ ............................................. B29C 41/04
[52] U.S. Cl. .................................. 425/116; 156/172;
156/500; 425/127; 425/429
[58] Field of Search ...................... 220/83 R, 67, 85 R, 220/72, 22; 264/310, 275, 277, 278, 273, 274, 311; 249/83; 428/35; 244/135 B; 156/169, 172, 156, 425, 500; 425/116, 127, 435, 429

[56] References Cited

U.S. PATENT DOCUMENTS

| | | | |
|---|---|---|---|
| 2,988,240 | 6/1961 | Hardesty | 156/169 |
| 3,129,014 | 4/1961 | Hutchison et al. | 156/156 |
| 3,132,761 | 5/1964 | Sylvester | 156/172 |
| 3,204,959 | 9/1965 | Nichols | 264/310 |
| 3,214,506 | 10/1965 | Corbin | 264/310 |
| 3,251,500 | 5/1966 | Archbold | 156/172 |
| 3,282,757 | 11/1966 | Brussee | 156/172 |
| 3,449,182 | 6/1969 | Wiltshire | 156/156 |
| 3,634,578 | 1/1972 | Susuki | 264/275 |
| 3,856,451 | 12/1974 | Holzinger | 425/435 |
| 3,938,928 | 2/1976 | Andrews | 425/435 |
| 3,951,190 | 4/1976 | Suter | 428/35 |
| 4,140,743 | 2/1979 | Ross | 264/310 |
| 4,143,193 | 3/1979 | Rees | 264/310 |
| 4,214,670 | 7/1980 | Berger et al. | 264/275 |
| 4,368,086 | 1/1983 | Villemain | 244/135 B |
| 4,517,231 | 5/1985 | May et al. | 264/275 |

FOREIGN PATENT DOCUMENTS 573307 11/1945 United Kingdom ............ 244/135 B

Primary Examiner—Willard E. Hoag
Attorney, Agent, or Firm—Pearne, Gordon, McCoy & Granger

[57] ABSTRACT

There is disclosed apparatus for rotationally casting a plastic liner for a pressure vessel having a metal access fitting molded therein. The apparatus includes a rotational casting arm having a mold supporting surface and adapted to be rotated about orthogonal axes. A hollow mold having a mold cavity surface conforming to the outside surface of the liner to be molded is removably attached to the mold supporting surface together with a metal access fitting. The metal access fitting has a longitudinal axis aligned with one of the orthogonal axes and has at least a first surface portion extending into the mold cavity. The first surface portion and the surface of the mold cavity are coated with plastic upon mold rotation to form the plastic liner.

12 Claims, 11 Drawing Figures

4,705,468

APPARATUS FOR ROTATIONALLY CASTING A PLASTIC TANK LINER HAVING AN ACCESS FITTING

BACKGROUND OF THE INVENTION

This invention relates generally to pressure vessels having adapter fittings mounted therein to provide access to the interior of the tank by plumbing connections. The invention is particularly concerned with techniques for manufacturing filament-wound plastic pressure vessels which are intended to contain corrosive and/or pressurized fluids. Pressure vessels of this type generally include a rotationally cast or blow-molded inner plastic liner which is wound with resin-impregnated glass filaments to provide adequate mechanical and structural properties for the side wall of the vessel. A typical pressure vessel would comprise a cylindrical side wall having oblate, ellipsoidal end portions, at least one of which is provided with an axial fitting which is adapted to be connected to a closure member or to plumbing connections.

According to the prior art, metallic and plastic fittings are associated with plastic tank liners by fusion or molding techniques, and the subassembly of the fitting and the liner are wound with resin-impregnated filaments. Examples of such pressure vessels may be found in U.S. Pat. Nos. 2,848,133; 3,874,544; 3,508,677; and 3,907,149.

The provision of a plastic fitting has some desirable aspects in that a thermoplastic fitting may be fused and cohered to a thermoplastic tank liner to provide a leak-proof joint. Plastic fittings, however, tend to radially expand upon the application of pressure and temperature to permit leakage or failure relative to a fitting closure member or a plumbing connection. Such fittings are desirably reinforced by integrally molded filaments or chopped fibers, and the external tank windings must be geometrically arranged about the fitting to provide a radial restraint against expansion. Metal fittings, on the other hand, possess adequate mechanical properties, but are subject to pitting and corrosion if subjected to many chemicals. Moreover, relatively complex assembly techniques are required in positioning the fitting on the liner prior to the winding operation.

In U.S. Pat. No. 3,825,145, there is disclosed a container which is preferably formed by a rotational casting technique and which has access fittings molded into the side wall of the container during its manufacture. The fittings are mounted in position on the mold so that the fittings are at least partially embedded in the wall of the molded article after the rotational casting operation. Associating the fittings with the mold cavity, however, requires precise machining operations, and renders the mold suitable only for use in molding a container having a uniquely sized fitting.

SUMMARY OF THE INVENTION

This invention relates to a technique for rotationally casting a plastic liner for a pressure vessel having a metal access fitting wherein the metal access fitting is removably mounted on the arm of the rotational casting machine in such a manner that the fitting may be removed from the arm and comprise a part of the liner. The fitting may be mounted on the arm so that at least that portion of the fitting which is exposed to the interior of the tank is coated with the plastic forming the liner.

According to certain aspects of this invention, the fitting may serve as a support for the mold during the rotational casting operation. Whether or not the fitting supports the mold during the casting operation, however, a variety of fittings may be molded into a plastic liner utilizing a mold which does not have to be specially adapted to accommodate the various fittings.

DETAILED DESCRIPTION OF THE INVENTION

Figure 1:
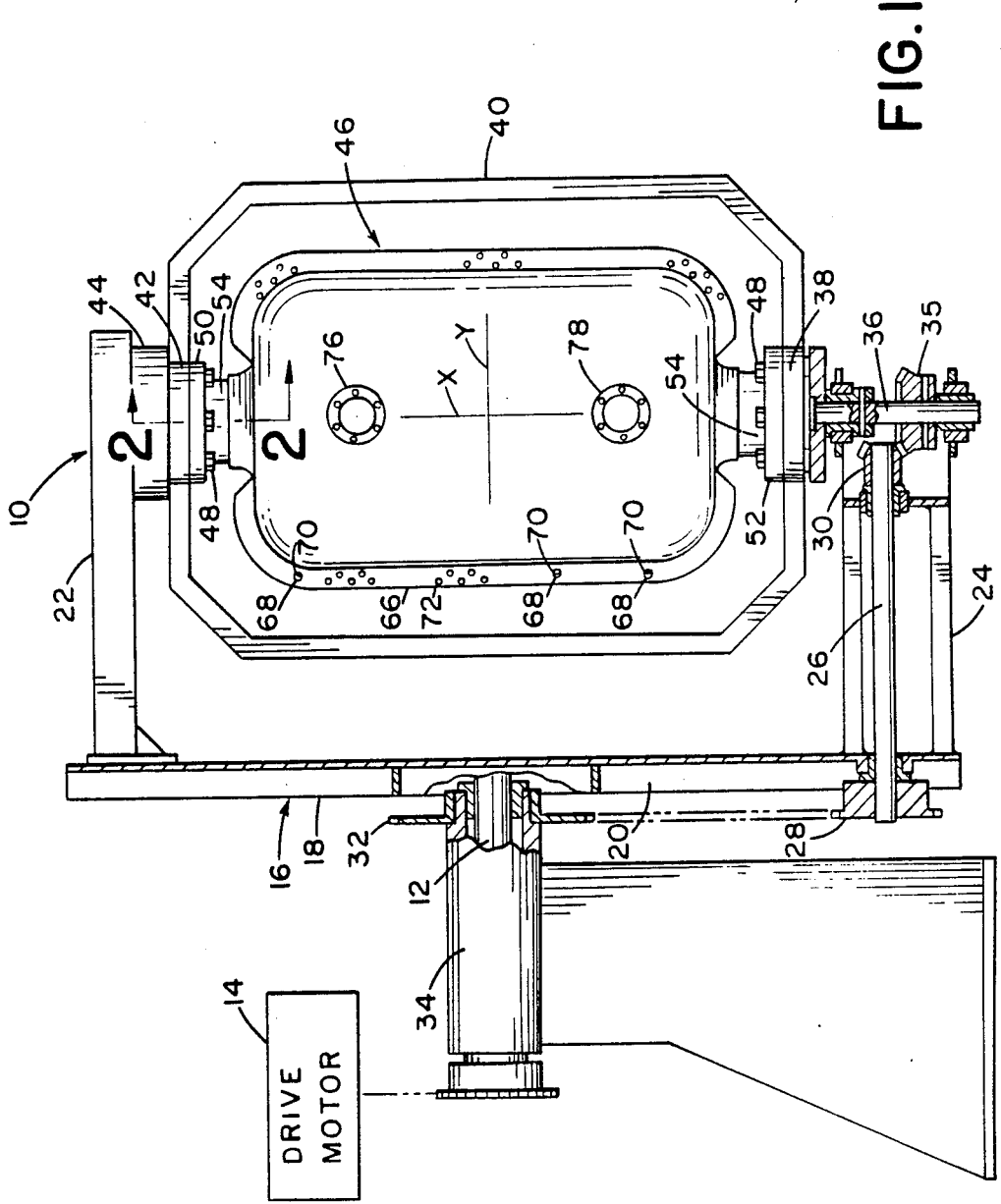
FIG. 1 is an elevational view of a portion of a rotational casting machine having a mold mounted in the casting arm of the machine for producing a plastic liner according to one aspect of this invention.

Referring now to the drawings, and particularly to FIG. 1, there is illustrated a conventional rotational casting apparatus suitable for performing the technique according to this invention. A conventional rotational casting molding operation consists of placing a plastic molding compound in finely divided form inside a hollow mold. The mold is then heated to a temperature above the melting point of the plastic and, at the same time, it is rotated about orthogonal axes. The powdered plastic inside the mold is heated by the heat transferred from the mold surface and sticks to the inner mold surface. Heating is continued for a sufficient length of time for complete melting of all of the plastic particles, and to permit bubbles to be released from the molten plastic. The thickness of the plastic article is determined by the amount of plastic placed within a given mold.

More particularly, the illustrated apparatus comprises a mold arm assembly 10. The assembly 10 includes a shaft 12 driven by a motor 14 about its longitudinal axis. The shaft 12 carries a mold mounting frame 16 which comprises frame members 18, 20, 22, and 24. The frame member 24 carries a shaft 26 which is provided at its ends with a sprocket 28 and a bevel gear 30. The sprocket 28, and therefore the shaft 26, are driven by a sprocket 32 mounted on a sleeve 34. The bevel gear 30 meshes with a bevel gear 35 to drive a shaft 36 which is fixed to a mounting plate 38 to rotate the mounting plate 38 about an axis X orthogonal to an axis Y of the shaft 12 and the sleeve 34. The mounting plate 38 is fixed to a mold frame 40 which, at its opposite end, carries a mounting plate 42 similar to the mounting plate 38. The mounting plate 42 is mounted in a bearing 44 carried by the member 22.

A rotational casting mold 46 is mounted between the mounting plates 38 and 42 by a plurality of bolts 48 which extend from the mounting plates 38 and 42 through the flanges 50 and 52 of metal access fittings 54, which are provided in a plastic liner to be molded by the illustrated apparatus.

Figure 2:
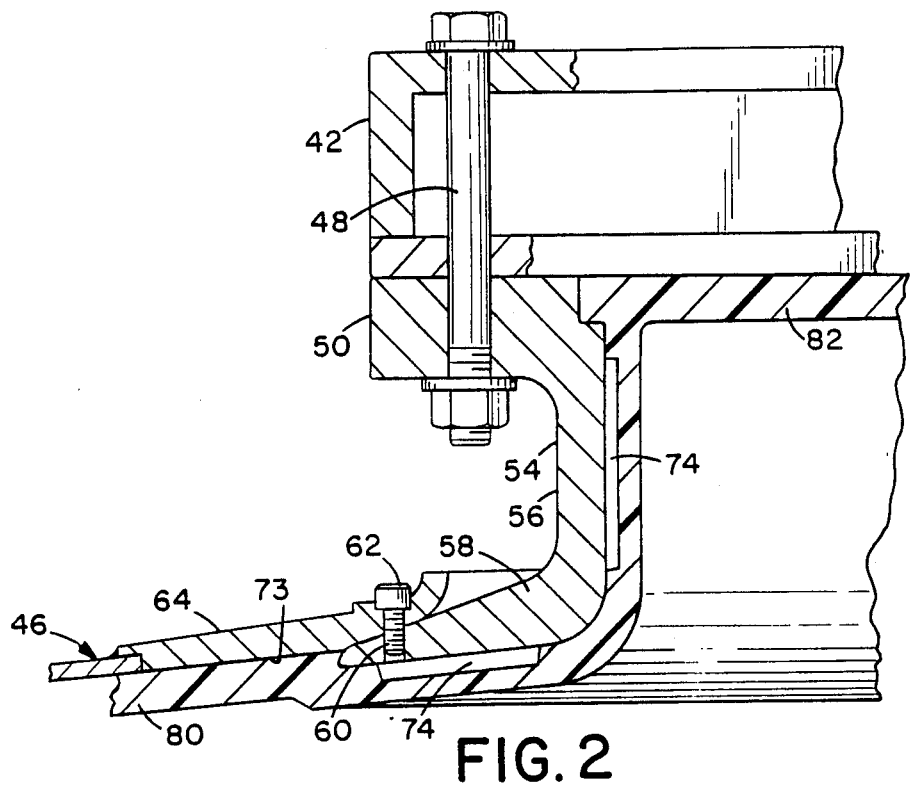
FIG. 2 is a cross-sectional view, the plane of the section being indicated by the line 2—2 in FIG. 1.

Referring now to FIG. 2, it may be seen that the fitting 54 comprises a cylindrical neck portion 56 provided with the annular flange 50 at one end and an annular tapered foot or radially outwardly extending flange portion 58 at its other end. The annular tapered foot portion 58 is provided with a plurality of threaded blind openings 60 therein which receive bolts 62 which pass through an upper rim portion 64 of the mold 46.

The mold 46 is generally cylindrical having a cylindrical body portion closed by oblate ellipsoidal end portions and is formed by two mold halves each having mating flanges 66. One of these flanges 66 is provided with pins 68 which register through apertures 70 in the other flange. If desired, quick-connect clamps (not shown) may be provided to secure the mold halves together, although the mold halves are retained in their illustrated position by the bolts 62 which firmly attach the mold halves to the fittings 54. A plurality of apertures 72 may be provided in the flanges 66 to reduce the mass of the mold 46. It may be noted that the inner surface 73 of the mold smoothly blends into the plane of the outer surface of the tapered flange 58 and it may be further noted that the fitting 54 is provided with internal locking ribs 74.

Additional access fittings, such as the fittings 76 and 78, may be provided in the side wall of the mold and may be initially attached thereto in the manner shown in FIG. 2. If desired, the fittings 76 and 78 may be further attached at their top flanges to additionally mold supporting members (not shown), such as the members 40.

To mold a plastic liner for a pressure vessel having the fittings 54, 76, and 78 integrally molded therein, a charge of powdered thermoplastic resin is placed within one of the mold halves and the mold is assembled to its fittings and to the rotational casting arm. The amount of powdered thermoplastic resin is predetermined to provide sufficient molding compound to coat the entire side surface of the mold and the fittings to a predetermined thickness. After the powder is put into the mold and the mold is assembled, the mold is rotated about the orthogonal axes X and Y, while the mold is heated to a predetermined temperature which will melt the thermoplastic resin. This operation is conducted within a closed oven which encloses the mold and the rotating arm 10. The application of heat to the mold causes the resin to melt or fuse, and the rotation of the mold about the orthogonal axes X and Y causes the liquid resin to uniformly coat the interior of the mold cavity and the interior of the fittings 54 so that a liner 80 is formed having a predetermined uniform thickness.

The liner 80 is adhered to the fitting 54 and is locked in place by the ribs 74. The smooth blending of the inside surface 72 of the mold into the plane of the flange 58 provides a smooth, continuing surface. After a predetermined time at the heating station, the arm is transferred to a cooling station, where the thermoplastic resin cools to a solid material. At a further operational station, the mold is disassembled and the liner, with its fittings 54, is removed from the mold.

Figure 3:
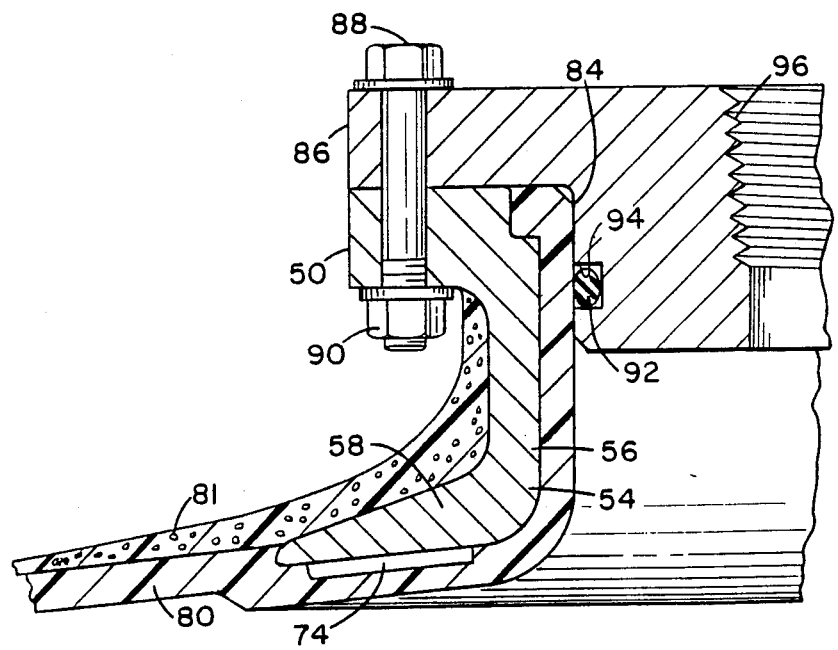
FIG. 3 is a fragmentary, cross-sectional view similar to FIG. 3 but showing the liner and its metallic insert wound with a filament winding and provided with a closure member in a completed task assembly.

Referring now to FIG. 3, a completed pressure vessel is provided by machining away a plug portion 82 of the liner 80 to form an access opening 84 in the pressure vessel. The side wall of the liner 80 is helically wound with filaments 81 to provide reinforcement for longitudinal and hoop stresses. A closure cap 86 is secured to the flange 50 by bolts 88 secured by nuts 90. The closure cap 86 is provided with an O-ring 92 which is retained in an O-ring groove 94 and which seals against the liner 80. If desired, a threaded access opening 96 may be provided through the cap 86 for plumbing connections.

Figure 4:
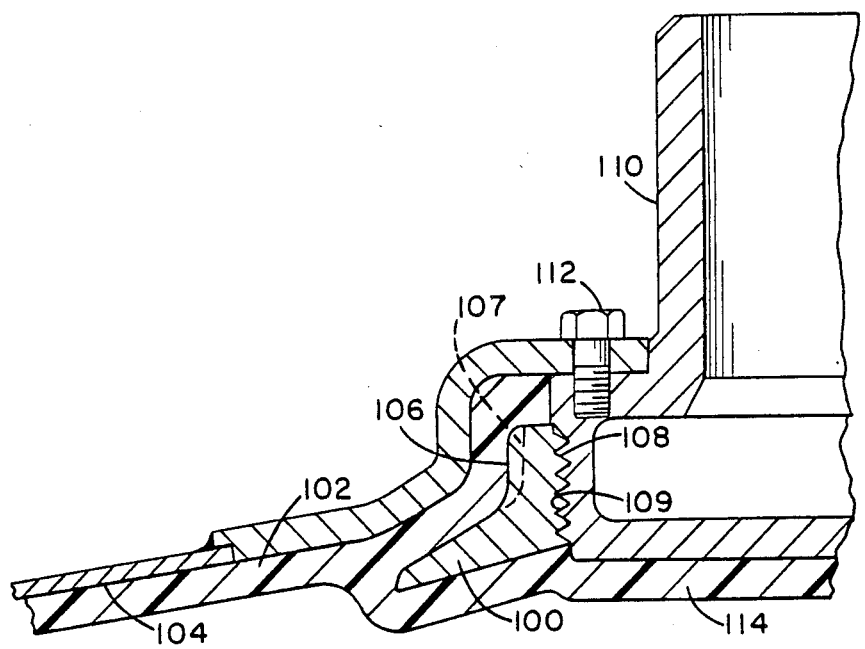
FIG. 4 is a cross-sectional view similar to FIG. 2, but showing an access fitting in accordance with a further aspect of this invention.
Figure 5:
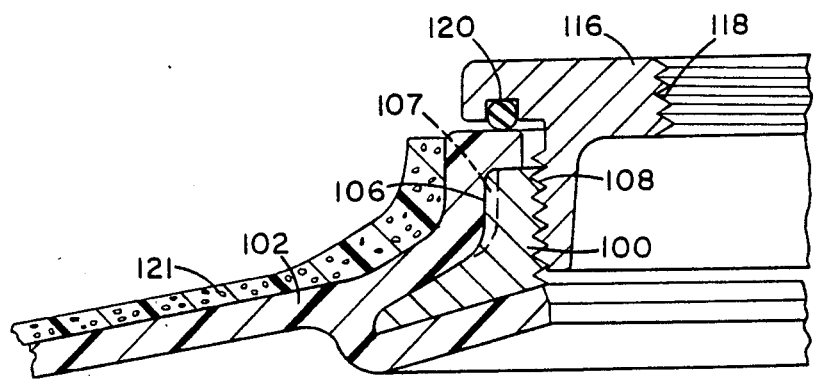
FIG. 5 is a cross-sectional view similar to FIG. 3, illustrating a completed assembly.

Referring now to FIGS. 4 and 5, a molded-in access fitting 100 is illustrated as being substantially entirely embedded in a plastic liner 102 which coats the inside surface of a mold 104 and the exposed surface 106 of the fitting 100. Ribs or grooves 107 may be provided on the fitting 100 to lock the fitting relative to the liner 102. The fitting 100 has a central aperture provided with threads 108 which cooperate with threads 109 on the mold support arm 110. The arm 110 is attached to the bearing 44 in the case of an upper fitting with respect to FIG. 1, or mechanically linked to the shaft 36 in the case of the lower fitting. The arm 110 is fixed to the fitting 100, and is also fixed to the mold 104 by bolts 112.

After the liner 102 and its fitting 100 are removed from the mold by removing the bolts 112 and by threading the fitting 100 from the arm 110, a liner plug 114 is machined away to provide the structure illustrated in FIG. 5. A closure cap 116 having a central threaded opening 118 for a plumbing connection is threaded into the fitting 100. The closure 116 is provided with an O-ring 120 which cooperates with the liner 102 to form a seal. The liner 102 is helically wound with resin-impregnated filaments 121 to provide reinforcement for longitudinal and hoop stresses in a completed pressure vessel.

Figure 6:
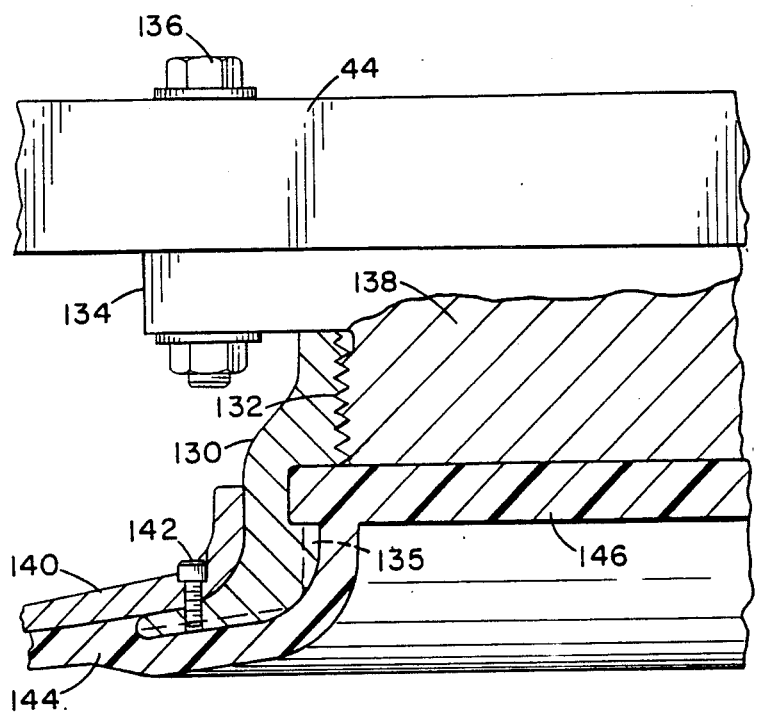
FIG. 6 is a fragmentary, cross-sectional view according to a further aspect of this invention similar to FIGS. 2 and 4.
Figure 7:
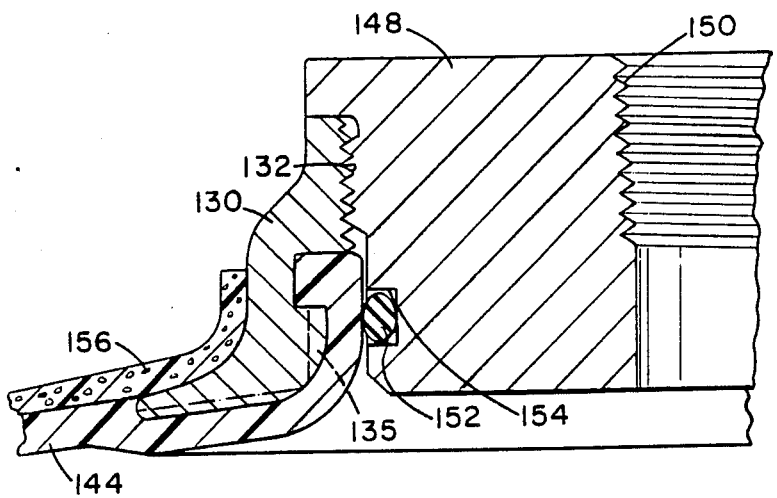
FIG. 7 is a fragmentary, cross-sectional view showing the liner and insert of FIG. 6 in a completed assembly.

Referring now to FIGS. 6 and 7, there is illustrated a further embodiment of the present invention. A liner fitting 130 provided with a threaded central aperture 132 is threaded onto a mounting plate 134. The fitting is provided with ribs or grooves 135 to lock the fitting 130 relative to a liner 144. The mounting plate 134 is fixed to the bearing 44 by bolts 136, and has a threaded cylindrical portion 138 which cooperates with the threaded apertures 132. The mold 140 is fastened to the fitting 130 by bolts 142 so that the interior of the mold 140 and the interior of the fitting 130 are coated with plastic which forms the liner 144.

After machining away the plastic liner portion 146, a closure cap 148 is threaded into the threaded aperture 132. The closure cap 148 has a threaded access opening 150 for connection to plumbing fittings and is provided with an O-ring 152 within a groove 154 to seal against the liner 144. The liner 144 is helically wound with resin-impregnated filaments 156 to provide the requisite longitudinal and hoop strengths.

Figure 8:
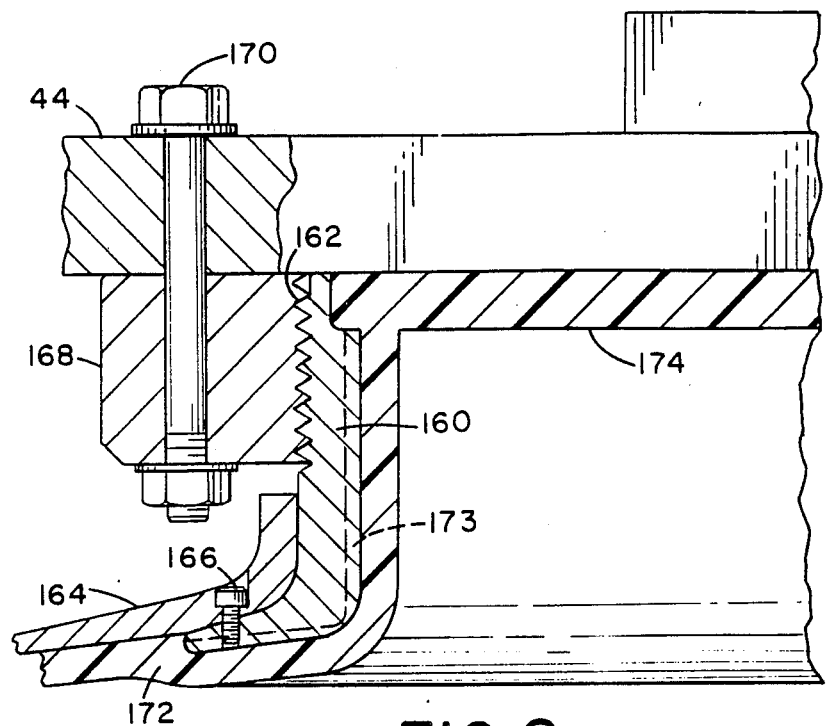
FIG. 8 is a fragmentary, cross-sectional view according to a still further aspect of this invention similar to FIGS. 2, 4, and 6.
Figure 9:
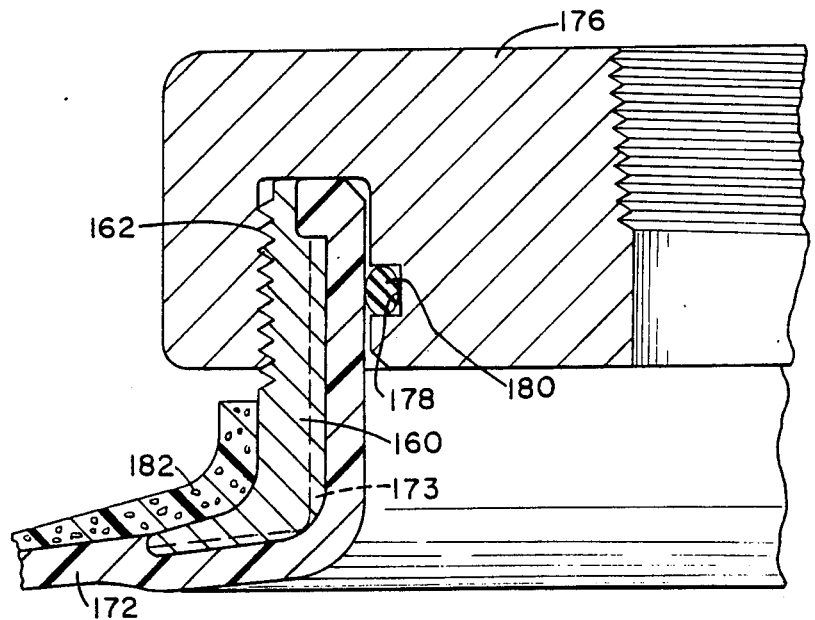
FIG. 9 is a fragmentary, cross-sectional view showing the molded liner and fitting of FIG. 8 in a completed assembly.

Referring now to FIGS. 8 and 9, there is illustrated a molding assembly according to a still further aspect of this invention. As may be seen in FIG. 8, a fitting 160 is provided. The fitting 160 has a threaded outer portion 162. The fitting 160 is peripherally fixed to a mold 164 by bolts 166 and is threadedly received in a ring 168 which is fixed to the bearing 44 by bolts 170. The rotational casting operation produces a liner 172 which is locked to the fitting by ribs or grooves 173.

After removing the liner 172 and its fittings 160 from the mold and the molding machine, a plug portion 174 of the liner 172 is machined away, and a cap 176 is threaded onto the fitting 160. The cap 176 is provided with a circumferential recess 178 which traps an O-ring 180 to provide a seal with the liner 172. The liner 172 is helically wound with fiber-reinforced filaments 182 to provide adequate circumferential and hoop strength to the completed assembly.

Figure 10:
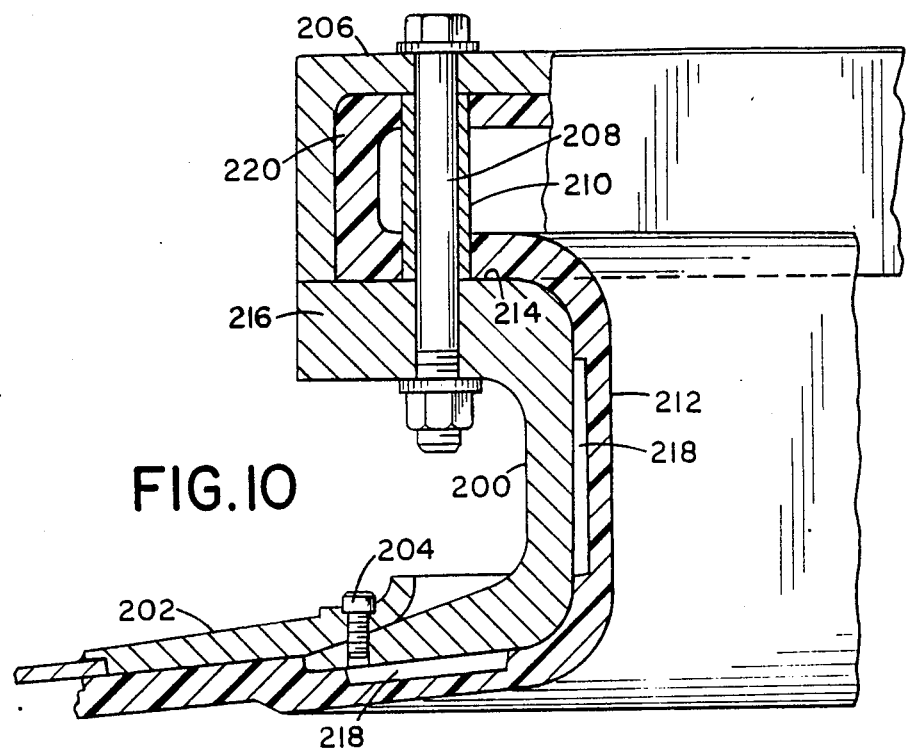
FIG. 10 is a fragmentary, cross-sectional view according to a still further aspect of the invention similar to FIGS, 2, 4, 6, and 8.
Figure 11:
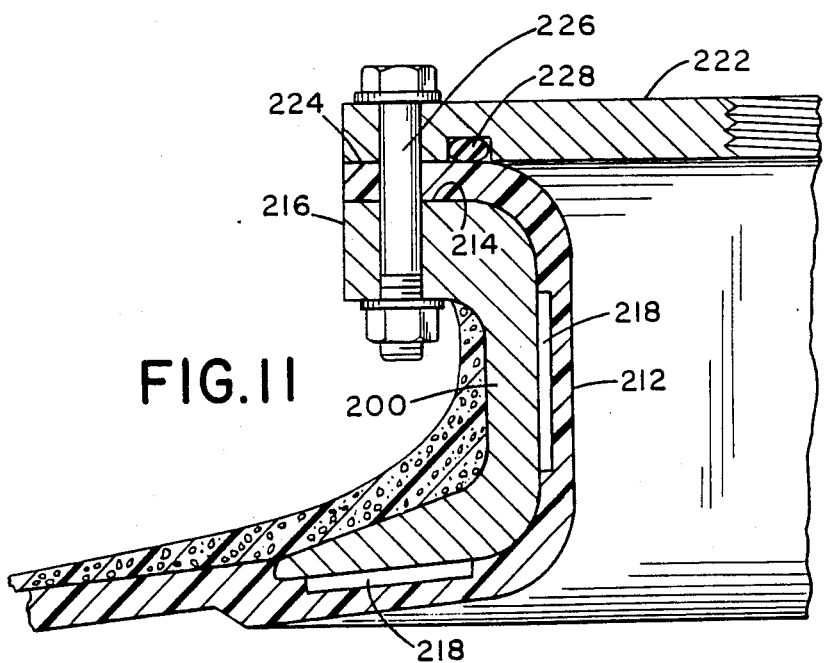
FIG. 11 is a fragmentary, cross-sectional view showing the molded liner and fitting to FIG. 10 in a completed assembly.

Referring finally to FIGS. 10 and 11, a moldedin access fitting 200 is provided. The fitting 200 is peripherally fixed to a mold 202 by bolts 204 and is fixed to a hollow mounting plate 206 by bolts 208, which in turn is fixed to a bearing 44 (as in FIG. 1). Spacers 210 are provided around the bolts 208. During a rotational casting operation, a plastic liner 212 coats the inside surface of the mold 202 and the interior of the fitting 200, including an upper surface 214 of a flanged portion 216 of the fitting 200. Ribs 218 may be provided on the fitting 200 to lock the fitting relative to liner 212.

After the liner 212 and its fitting 200 are removed from the mold by removing the bolts 204 and from the molding machine by removing the bolts 208 and the mounting plate 206, a liner plug 220 is machined away to provide the structure illustrated in FIG. 11. A closure cap 222 is positioned over the mouth of the fitting 200 in sealing contact with a machined face 224 of the liner 212 and is held in place by bolts 226. An O-ring 228 is provided to form a peripheral seal. The liner 212 is helically wound with resin-impregnated filaments 230 to provide reinforcement for longitudinal and hoop stresses in a completed pressure vessel.

Although the preferred embodiment of this invention has been shown and described, it should be understood that various modifications and rearrangements of the parts may be resorted to without departing from the scope of the invention as disclosed and claimed herein.

What is claimed is:

1. Apparatus for rotationally casting a plastic liner for a pressure vessel having a metal access fitting, comprising a rotational casting arm having a mold supporting surface rotatable about two axes of revolution, a hollow mold having a mold cavity surface conforming to the outside surface of the liner to be molded, means removably attaching said mold supporting surface to said hollow mold, the mold including an aperture adjacent said supporting surface and having means for removably attaching an annular metal access fitting to said mold supporting surface said fitting having a longitudinal axis aligned with one of said axes of revolution and having a neck and a flange, the neck extending axially in the aperture and the flange extending in the mold radially outward of the neck, the flange being of sufficient radial extent beyond the neck to provide a peripheral area adapted to be constrained by resin impregnated wound filaments and the neck being of sufficient axial length beyond the flange to at least extend through the thickness of the filament winding, the fitting having at least a first surface portion extending into said mold cavity, said first surface portion together with the surface of the mold cavity cooperating to form the shape of the liner and being coatable with molding composition the access fitting and liner forming a permanent assembly upon casting of the liner.

2. Apparatus for rotationally casting a plastic liner for a pressure vessel according to claim 1, wherein said metal access fitting has a second surface portion in abutting relationship to the mold cavity so that said second surface portion forms a smooth continuation of the outside surface of the molded liner.

3. Apparatus for rotationally casting a plastic liner according to claim 2, wherein fastening means extend through said mold wall and into said second surface portion but terminate short of the first surface portion.

4. Apparatus for rotationally casting a plastic liner according to claim 1, wherein said metal access fitting has a scond surface portion facing and spaced from the mold cavity surface so that said first and second surface portions are embedded in the wall of said liner.

5. Apparatus for rotationally casting a plastic liner according to claim 4, wherein said metal access fitting includes a third surface portion fixed to said mold supporting surface.

6. Apparatus for rotationally casting a plastic liner according to claim 5, wherein said third surface portion is threadedly fixed to said mold supporting surface and, upon removal of said liner from said mold and said mold supporting surface, is adapted to receive a threaded closure.

7. Apparatus for rotationally casting a plastic liner according to claim 1, wherein said mold is formed by mold halves having a parting plane passing through a longitudinal axis of said access fitting coincident with one of said axes of revolution.

8. Apparatus for rotationally casting a plastic liner for a pressure vessel according to claim 7, wherein said mold has a cylindrical side wall and oblate ellipsoidal end portions and wherein said metal access fitting is positioned in one of said end portions.

9. Apparatus for rotationally casting a plastic liner for a pressure vessel according to claim 8, wherein a metal access fitting is positioned in each of said end portions.

10. Apparatus for rotationally casting a plastic liner for a pressure vessel according to claim 8, wherein a metal access fitting is positioned in said cylindrical side wall with said parting plane passing through said longitudinal axis of said fitting.

11. Apparatus for rotationally casting a plastic liner for a pressure vessel having a metal access fitting, comprising a rotational casting arm having mold supporting surface means adapted to be rotated about two axes of revolution, a hollow mold having a mold cavity surface conforming to the outside surface of the liner to be molded, means removably attaching said mold supporting surface means to said hollow mold, said hollow mold having at least one aperture therethrough communicating with said mold cavity surface, a metal access fitting for said plastic liner mounted in said aperture, said access fitting having a neck portion projecting out of said aperture and being radially spaced from the perimeter of said aperture and having an annular flange portion extending radially within said hollow mold, said flange portion having a first surface exposed to the interior of said mold and a second surface partially abutting a portion of the mold cavity surface surrounding said aperture and partially exposed in a space between said neck portion and the perimeter of said aperture, and means removably attaching said fitting to said hollow mold, said first surface portion together with the surface of the mold cavity cooperating to form the shape of the liner and said fitting being coatable with molding composition, the flange portion being of sufficient radial extent beyond the neck portion to provide a peripheral area configured to be constrained by resin impregnated wound filaments to unite and the neck portion being of sufficient axial length beyond the flange to at least extend through the thickness of the filament winding whereby a variety of access fittings having varying neck portion diameters may be positioned in said aperture of a mold without requiring mold changes in the rotational casting apparatus, said liner being removable from the mold.

12. Apparatus for rotationally casting a plastic liner according to claim 11, wherein fastening means extend through said mold wall and into said second surface portion but terminate short of the first surface portion.

* * * * *